United States Patent [19]
Drake et al.

[11] 3,884,321
[45] May 20, 1975

[54] LOAD HANDLING VEHICLES HAVING ADJUSTABLE CAB

[75] Inventors: Ronald Drake; Kenneth Smith, both of Wakefield, England

[73] Assignee: Joshua Shaw & Sons Limited, Batley, Yorkshire, England

[22] Filed: Jan. 25, 1974

[21] Appl. No.: 436,496

[30] Foreign Application Priority Data
Nov. 10, 1973 United Kingdom............... 52278/73

[52] U.S. Cl............................................. 180/89 R
[51] Int. Cl........................................... B60k 35/00
[58] Field of Search......... 180/89 R, 89 A; 214/518, 214/DIG. 10; 296/28 C

[56] References Cited
UNITED STATES PATENTS

| | | | |
|---|---|---|---|
| 2,143,983 | 1/1939 | Howell.......................... | 180/89 A X |
| 3,398,984 | 8/1968 | Ajero ........................... | 180/89 R X |
| 3,435,969 | 4/1969 | McCartney ................... | 180/89 R X |
| 3,595,409 | 7/1971 | Bowman-Shaw.............. | 180/89 R X |
| 3,721,077 | 3/1973 | van der Lely................. | 180/89 R X |

Primary Examiner—David Schonberg
Assistant Examiner—Terrance L. Siemens
Attorney, Agent, or Firm—Wolf, Greenfield & Sacks

[57] ABSTRACT

A load handling vehicle, particularly a side-loader, having a driver/operator cabin which is movable on the vehicle between spaced positions to give the driver/operator an improved view. The cabin is pivotally mounted on one end of a parallel linkage the other end of which is pivotally mounted on the vehicle, the links are contractible and expansible lengthwise, a rigid restraining member is connected between the portion of the links pivoted to the cabin and a cabin motion control means which contracts and expands the links, and the linkage is swung and the control means operated to move the cabin in a substantially straight line. The cabin motion control means may include a crank device driven in conjunction with the linkage swinging means, and the latter means may include sprocket and chain mechanism through which the crank device is driven.

The cabin may have rollers running on a bearing surface to support its weight.

In a simplified arrangement the cabin may be mounted to be swung on arms in an arc or other curved path.

5 Claims, 5 Drawing Figures

LOAD HANDLING VEHICLES HAVING ADJUSTABLE CAB

This invention relates to load handing vehicles, such as the so called 'side loaders', front loaders and the like.

These load handling vehicles usually are provided with a driver's/operator's cabin located suitably to enable the driver to have an adequate unobstructed view to control the driving of the vehicle, and, as much as possible, to leave maximum space for the load.

However, in some cases, especially in side loaders, where the cabin is located to one side of the vehicle, it is desirable that the cabin should be capable of being moved transversely of the vehicle, to enable the driver/operator to view either side of the vehicle at will, which is useful, for example, during a loading or load transporting operation.

There are known arrangements for the moving of a side loader cabin transversely of the vehicle, such arrangements comprising guides on which the cabin travels across the width of the vehicle.

This invention is concerned with another arrangement for the moving of the cabin between two extreme positions. Depending upon the construction of the vehicle and the requirements for the movement of the cabin between said positions, the cabin can be displaced transversely and/or longitudinally of the vehicle.

According to the invention there is provided a load handling vehicle having a driver's/operator's cabin which is movable between two spaced positions be being connected to two fixed pivots of a linkage defined by two links each pivotally connected to the cabin at one end and pivotally connected to the vehicle at the other end, said links being contractible, a rigid rod connected at one end to a cabin motion means for moving the said one end of the restraining rod in a direction away from the cabin as the cabin moves between positions, and connected at its other end to act on said cabin pivots to contract the said links as the cabin moves between said positions, and a drive means adapted to swing the links about said fixed pivots to move the cabin between said positions, said drive means being connected to the cabin motion control means to move same and the restraining rod to contract then expand said links as the cabain moves between positions so that the cabin moves more or less in a straight line between said positions.

Preferably, the said links are parallel and the pivots at the ends of the links define a parallelogram.

Preferably, each link is in two telescopically interfitting parts of which one part has bearing rollers for the support of the other part.

The rigid restraining rod may be pivotally connected to the mid point of a cross connection bar, said bar being pivotally connected to the parts of said links which are pivotally connected to the cabin.

The said cabin motion control means may include a crank having an axis of rotation spaced equi-distant from said two fixed pivots of the links, to the crank pin of which is connected the end of said rigid restraining rod, said crank being connected to said drive means so that its pin travels through an arc of a circle of equal extent on each side of a line normal to and bisecting a line joining said two fixed pivots.

The drive means for the two links may comprise a drive sprocket coaxially arranged with each of the two fixed pivots, and endless chain trained round said drive sprockets, and the cabin motion means may include a control sprocket which is coaxially arranged on the axis of rotation of and drivingly connected to said crank, said control sprocket being in driving engagement with said chain. A hydraulic motor having a motor sprocket in engagement with the chain may be provided as a prime mover.

The load handling vehicle preferably is a side loader, and the cabin preferably is located to be moved between positions at the sides of the vehicle which positions are spaced apart at right angles to the length of the vehicle. It Will be appreciated that the cabin can be stopped in any position intermediate said spaced positions.

There may be a bearing surface or surfaces for the cabin to support its weight or part of its weight as it moves between said positions. To this end, the cabin may have one or more bearing rollers which run on said bearing surface or surfaces.

In a simplified construction according to the invention the cabin may be arranged for swinging between positions by parallel links so as to move in an arcuate path between said positions while maintaining its attitude relative to the vehicle.

Two embodiments of the invention will now be described, by way of example, with reference to the accompanying drawing, wherein:-

FIG. 3 is an elevation of the vehicle end shown in FIGS. 1 and 2, looking in the direction of arrow A in FIG. 2, some positions being cut through;

Figure 1:
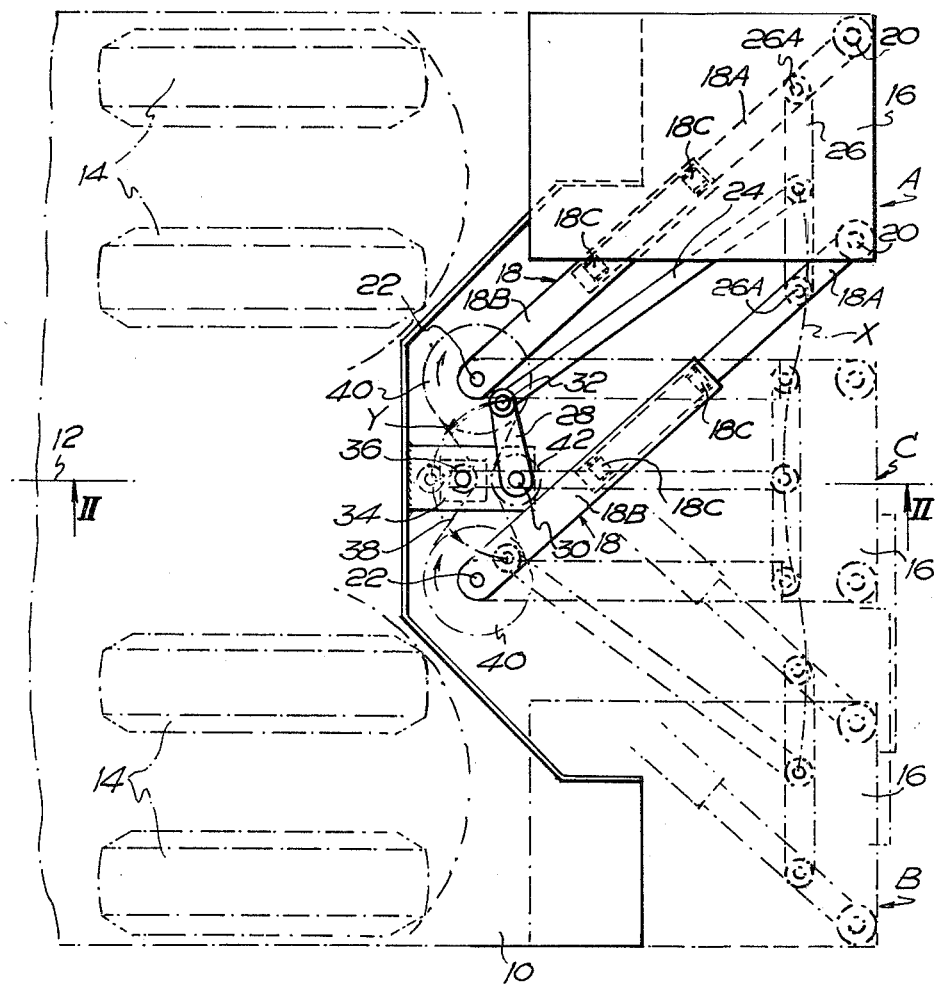
FIG. 1 is a plan view of the front end of a side loader vehicle according to the invention.
Figure 2:
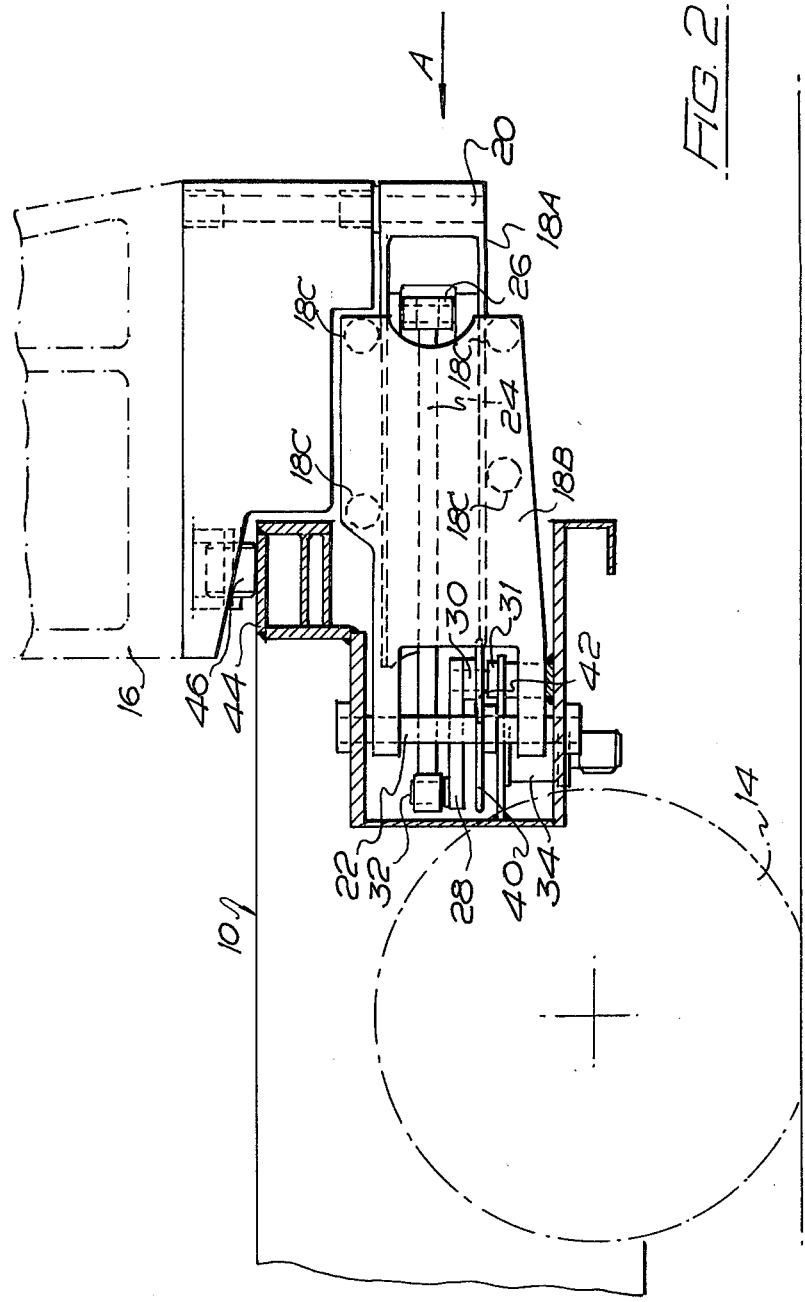
FIG. 2 is a sectional side elevation of the front end of the vehicle shown in FIG. 1, the section being on the line II—II in FIG. 1.
Figure 3:
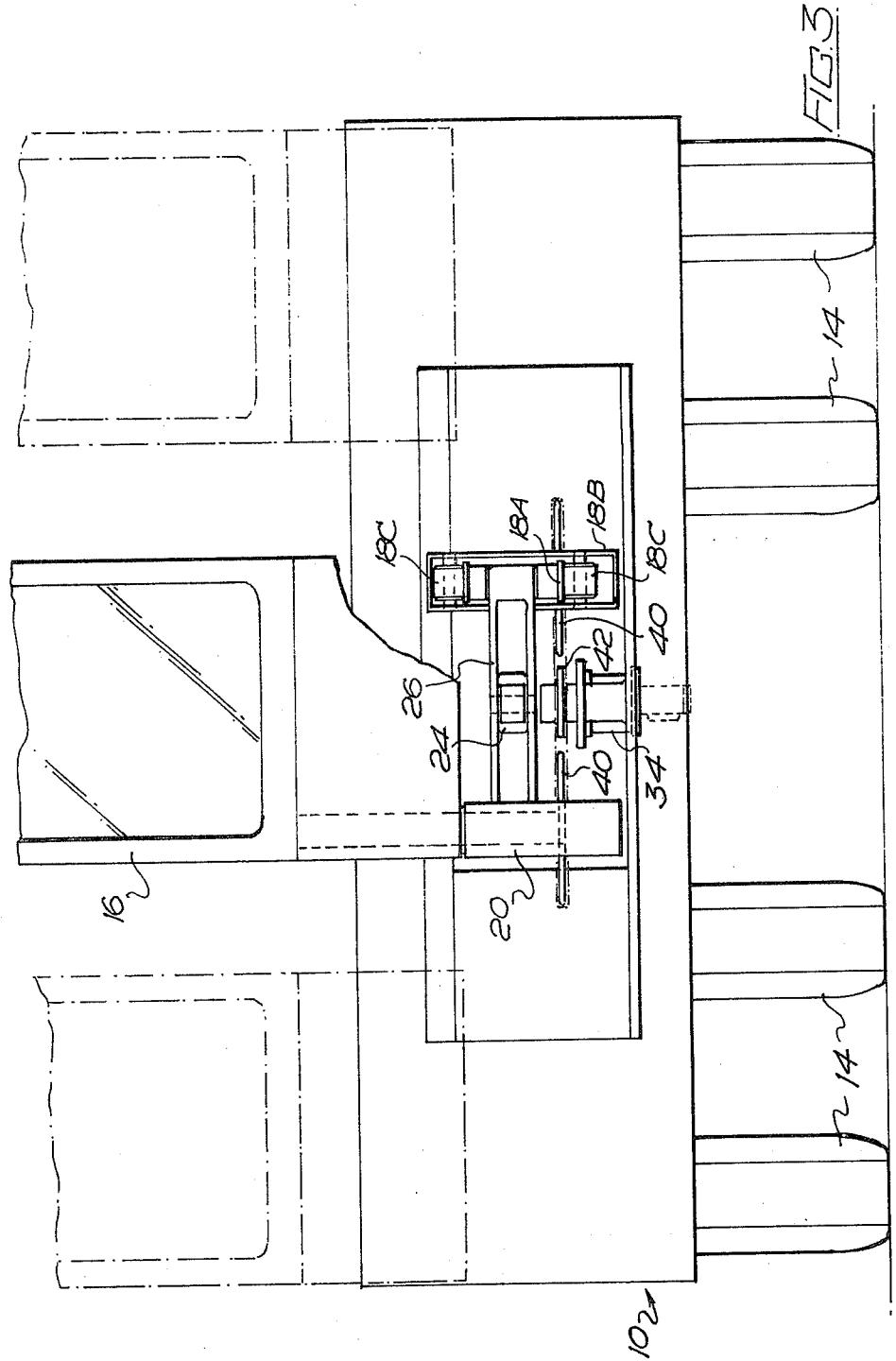

Referring to FIGS. 1 to 3 of the drawing, the figures show the front end of a side loader vehicle comprising a front section 10 and a rear section (not shown). These two sections are joined together along one side of the vehicle by a back bone (also not shown), so as to define a space, open to the other side of the vehicle, between the front and rear sections. In this space, there is provided a fork lift mechanism for the raising and lowering of loads to be carried by the vehicle. Side loader vehicles of this type are well known and the invention does not require any further description or illustration thereof.

The longitudinal centre line of the vehicle is indicated by numeral 12 in FIG. 1, and the figures also show that the front end of the vehicle is provided with two pairs of wheels 14 located at the respective sides of the vehicle. Each wheel pair 14 is steerable as a unit, as is conventional in side loading vehicles of this type.

The driver's/operator's cabin, which is indicated by numeral 16, is carried at the extreme front end of the front section 10 of the vehicle, and it is mounted for movement between two positions A and B which are symmetrically disposed relative to the longitudinal central axis 12 of the vehicle, and are spaced at right angles to said axis 12. In FIG. 1, the cabin 16 is shown in full lines in position A, and in chain dotted lines in position B. As regards the other two FIGS., 2 and 3, these show the cabin 16 in the central position C, in full lines. The cabin 16 is also shown in position C in FIG. 1, but again in chain dotted lines.

The cabin 16 is adapted to be moved between the positions A and B by being connected to two parallel contractible links 18. Of each link 18, one end is pivotably connected to the cabin 16 at a pivot 20, and the other end is pivotally connected to the vehicle at a fixed pivot 22. The pivots 22, which are disposed symmetrically relative to the axis 12, and the pivots 20 together define a parallelogram type linkage, so that, as the cabin 16 moves between positions A and B, its attitude relative to the vehicle remains fixed.

In order that the cabin 16 should travel more or less in a straight line as it moves between positions A and B there is provided a restraining rod 24, in order to effect a contraction and then an expansion of links 18 as the cabin 16 moves transversely over the vehicle. This restraining rod 24 is pivotally connected at one end to the mid point of a crossbar 26, the ends of which are pivotally connected at 26A to the outer parts 18A of links 18. These parts 18A are pivotally connected at the pivots 20 to the cabin 18, and are retractible into the other parts 18B of the links 18 by fitting into said parts 18B and by being carried on support rollers 18C (see particularly FIG. 2). At its other end the rod 24 is connected to a cabin motion control means, in the form of a crank 28 pivotal about an axis 30 on a support bracket 31, which axis is vertical and intersects the axis 12. The rod 24 is pivotally connected to the crank pin 32 of crank 28.

A hydraulic motor 34 (FIG. 1) is used for propelling the cabin 16 between positions A and B and this motor is provided with a motor sprocket 36 on its output shaft which sprocket engages an endless chain 38 trained round drive sprockets 40, respectively in driving engagement with the links 18. The motor sprocket 36 engages one reach of the chain 38 whilst the other reach of the chain 38 is engaged by a control sprocket 42, which is drivingly connected to crank 28. The arrangement of the sprockets 36, 40 and 42, is shown clearly in FIG. 1 and it will be seen that for any given rotation of the motor sprocket 36, drive sprockets 40 will rotate in one direction, and the control sprocket 42 will rotate in the opposite direction.

As shown in FIG. 2 the vehicle includes a support surface 44 on which runs a bearing roller 46, rotatably mounted on the underside of cabin 16. This arrangement serves to support part of the weight of the cabin 16, and to remove excess bending stress from the arms 18 during the movement of the cabin 16 between positions A and B.

In the moving of the cabin 16 between positions A and B, the motor 34 is driven to cause the sprockets 40 to rotate in the directions indicated by the arrows in FIG. 1, and the links 18 swing clockwise in FIG. 1. At the same time, the crank 28 is rotated anti-clockwise, thereby moving pivot 32 in the direction away from the cabin along the arcuate path Y. This has the effect of causing contraction of the links 18 as movement takes place between positions A and C, and of allowing re-expansion of the links, as movement takes place between positions C and B. In actual fact, the path of movement traced out by the cabin 16, is indicated by path of movement X in FIG. 1. It will be seen that this path of movement approximates to a straight line, and any undesired forward swinging of the cabin 16, which would take place if the parallelogram motion were not compensated, is avoided.

Instead of using the chain and sprocket mechanism described above for swinging the links and operating the crank, other suitable means may be substituted for achieving the necessary movement. For example, the links may be swung by a hydraulic ram and cylinder assembly, and arranged to transmit motion to the crank to rotate this in the appropriate direction to contract or expand the links.

Figure 4:
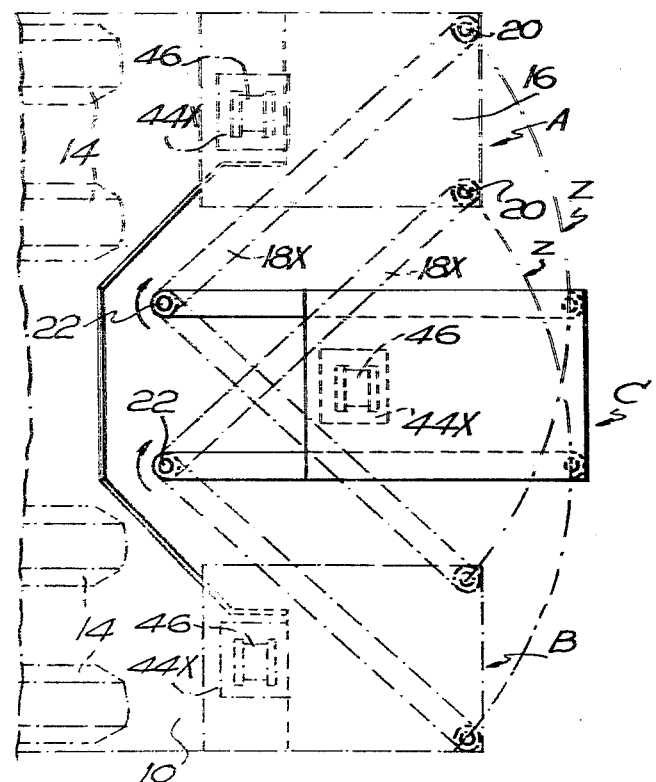
FIG. 4 is a plan view similar to FIG. 1 but illustrating a simplified construction according to the invention.
Figure 5:
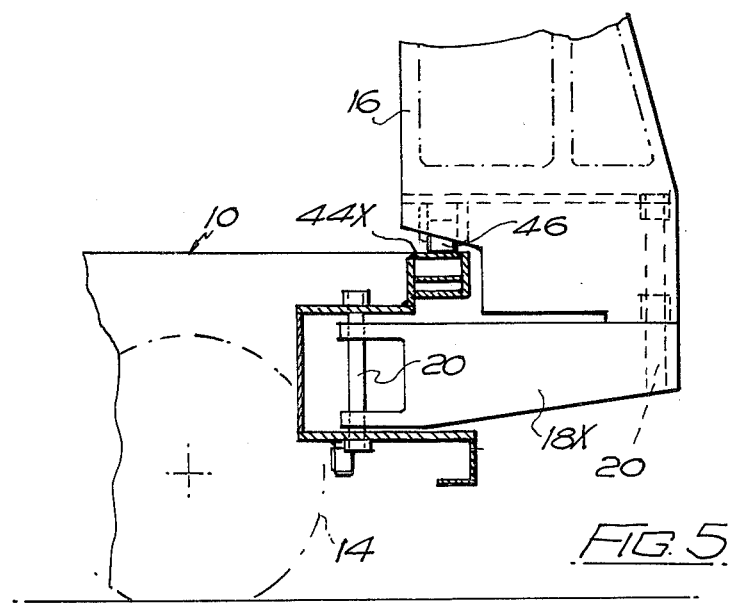
FIG. 5 is a side elevation corresponding to FIG. 4 with some positions cut through, the cabin being shown in position B.

In the construction illustrated in FIGS. 4 and 5 like parts to those shown in FIGS. 1 to 3 are indicated by the like reference numerals and corresponding parts which are modified are indicated by like reference numerals with the addition of an X. In this construction the parallel links 18X are not extensible and contractible but are arranged to be swung about the fixed pivots 22 so that the cabin pivots 20 move in two arcs Z as indicated in FIG. 4 and the cabin maintains its attitude relative to the vehicle. This construction may be suitable for swinging the cabin between two positions (for example, from one side to the other of a side loader vehicle) where there is no objection to the path of swinging of the cabin causing it in the central part of such path to extend longitudinally beyond the extreme lateral positions.

In this case also the cabin has a bearing roller 46, but instead of the continuous support surface 44 there are separate support surfaces 44X onto which the roller runs when the cabin reaches any of positions A, B and C, thereby giving added support to the cabin in these positions which are those usually occupied by the cabin during loading, unloading and travelling of the vehicle. As the links can be of one-piece construction they may be rigid enough to support the cabin weight during swinging, although a continuous support surface may be provided if desired.

The links 18X may be swung by the motor driven chain and sprocket mechanism described with reference to FIGS. 1 to 3 or by a ram and cylinder assembly or other suitable means.

We claim:

1. In a vehicle of the type having an adjustable cab movable on the vehicle between two extreme laterally spaced positions, the improvement comprising
   1. a pair of parallel links, each link being extensible and contractible in length, each link being pivotally anchored on the vehicle and being pivotally attached to the cab to form a parallelogram whereby the cab can be swung laterally on the parallel links,
   2. drive means adapted to turn the parallel links about the pivots anchored on the vehicle,
   3. and restraining means connected to the parallel links and to the vehicle, the restraining means causing the length of the parallel links to be altered as the cab moves whereby lateral motion of the cab is confined to a substantially straight path.

2. The improvement according to claim 1, wherein each link is formed by two telescopically interfitting members, and one of the members has bearing rollers which support the other member.

3. The improvement according to claim 1, wherein the restraining means comprises
   a. a crossbar pivotally connected to the parallel links, the crossbar being parallel to two sides of the parallelogram, b. a crank pivotally mounted on the vehicle, the rotational axis of the crank being equi-distant from said two pivots anchored on the vehicle, c. and a tie rod pivotally connected to the crossbar and to the crank.

4. The improvement according to claim 3, wherein the drive means for turning the parallel links comprises a. at least one drive sprocket, the drive sprocket being coaxial with one of the pivots anchored on the vehicle, b. a control sprocket coaxial with the rotational axis of said crank, the crank being arranged to turn with the control sprocket, c. an endless chain trained over the control sprocket and the drive sprocket, d. and a motor for causing the control sprocket to turn.

5. The improvement according to claim 1, further including d. means on the vehicle providing a support surface extending parallel to the aforesaid substantially straight path, e. and means on the cab adapted to roll on the support surface whereby at least part of the weight of the cab is supported on said surface as the cab changes position.

* * * * *